(12) United States Patent
Vanhall

(10) Patent No.: US 9,563,799 B2
(45) Date of Patent: *Feb. 7, 2017

(54) METHODS AND SYSTEMS FOR REDUCING THE LIKELIHOOD OF FALSE POSITIVE DECODES

(71) Applicant: LOCKHEED MARTIN CORPORATION, Bethesda, MD (US)

(72) Inventor: Richard C. Vanhall, Owego, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/969,203

(22) Filed: Dec. 15, 2015

(65) Prior Publication Data

US 2016/0098588 A1   Apr. 7, 2016

Related U.S. Application Data

(63) Continuation of application No. 14/262,127, filed on Apr. 25, 2014.

(60) Provisional application No. 61/949,528, filed on Mar. 7, 2014.

(51) Int. Cl.
*G06K 5/00* (2006.01)
*G06K 7/14* (2006.01)

(52) U.S. Cl.
CPC ........... *G06K 7/1473* (2013.01); *G06K 7/1413* (2013.01)

(58) Field of Classification Search
CPC ..... G06K 5/00; G06K 7/1404; G06K 7/10871
USPC ................. 235/437, 462.01, 462.07, 462.25
See application file for complete search history.

(56) References Cited

U.S. PATENT DOCUMENTS

| 5,548,110 | A | 8/1996 | Storch et al. |
|---|---|---|---|
| 6,631,842 | B1 | 10/2003 | Tsikos et al. |
| 7,207,481 | B2 | 4/2007 | Barenburg et al. |
| 7,264,169 | B2 | 9/2007 | Juds |
| 8,138,438 | B2 | 3/2012 | Stemmle |
| 2009/0072035 | A1 | 3/2009 | Ota |
| 2010/0025309 | A1 | 2/2010 | Burns et al. |
| 2011/0068175 | A1 | 3/2011 | Powers et al. |
| 2011/0073650 | A1 | 3/2011 | Chiou et al. |

FOREIGN PATENT DOCUMENTS

WO    WO-2013083544    6/2013

OTHER PUBLICATIONS

International Search Report for Application No. PCT/US2014/035492 dated Sep. 2, 2014; 2 pages.

(Continued)

*Primary Examiner* — Daniel St Cyr
(74) *Attorney, Agent, or Firm* — Kent Kemeny; Andrew M. Calderon; Roberts Mlotkowski Safran, Cole & Calderon, P.C.

(57) ABSTRACT

Systems and methods for reducing the likelihood of false positive decodes within a set of barcodes are disclosed. The method can be implemented in a computing device, which includes: providing a list of barcode configurations that meet damage tolerance criteria; reducing, if possible, each configuration list to barcode configurations that have a compatible configuration pair between sets; and comparing all possible combinations of barcode type configurations to find at least one set of configurations that are resistant to false positives decodes between barcode types during decoding processes.

10 Claims, 5 Drawing Sheets

```
Compatible pairs of A and B (1st 14 of 1850 entries)

12 5 0000009D 00000B90 5 *** 17 5 00001E5D 000174F0 9
12 5 0000009D 00000B90 5 *** 17 5 00001E5F 0001F4F0 10
12 5 0000009D 00000B90 5 *** 17 5 00002A2D 000168A8 7
12 5 0000009D 00000B90 5 *** 17 5 00002CB2 00009A68 7
12 5 0000009D 00000B90 5 *** 17 5 00002CB3 00019A68 8
12 5 0000009D 00000B90 5 *** 17 5 000034D2 00009658 7
12 5 0000009D 00000B90 5 *** 17 5 000034D3 00019658 8
12 5 0000009D 00000B90 5 *** 17 5 00003A6D 00016CB8 9
12 5 0000009D 00000B90 5 *** 17 5 00003A7A 0000BCB8 9
12 5 0000009D 00000B90 5 *** 17 5 00003A7B 0001BCB8 10
12 5 0000009D 00000B90 5 *** 17 5 00003C32 00009878 7
12 5 0000009D 00000B90 5 *** 17 5 00003C76 0000DC78 9
12 5 0000009D 00000B90 5 *** 17 5 00003CBA 0000BA78 9
12 5 0000009D 00000B90 5 *** 17 5 00003CBB 0001BA78 10
. . .

1850 results form 358,657 possibilities (13 x 27589)
```

(56) References Cited

OTHER PUBLICATIONS

Written Opinion for Application No. PCT/US2014/035492 dated Sep. 2, 2014; 5 pages.
Notice of Allowance dated Jan. 21, 2016 in related U.S. Appl. No. 14/262,127, 13 pages.

Compatible pairs of A and B (1st 14 of 1850 entries)

| | | | | | | | |
|---|---|---|---|---|---|---|---|
| 12 | 5 | 0000009D | 00000B90 | 5 | *** | 17 | 5 | 00001E5D | 000174F0 | 9 |
| 12 | 5 | 0000009D | 00000B90 | 5 | *** | 17 | 5 | 00001E5F | 0001F4F0 | 10 |
| 12 | 5 | 0000009D | 00000B90 | 5 | *** | 17 | 5 | 00002A2D | 000168A8 | 7 |
| 12 | 5 | 0000009D | 00000B90 | 5 | *** | 17 | 5 | 00002CB2 | 00009A68 | 7 |
| 12 | 5 | 0000009D | 00000B90 | 5 | *** | 17 | 5 | 00002CB3 | 00019A68 | 8 |
| 12 | 5 | 0000009D | 00000B90 | 5 | *** | 17 | 5 | 000034D2 | 00009658 | 7 |
| 12 | 5 | 0000009D | 00000B90 | 5 | *** | 17 | 5 | 000034D3 | 00019658 | 8 |
| 12 | 5 | 0000009D | 00000B90 | 5 | *** | 17 | 5 | 00003A6D | 00016CB8 | 9 |
| 12 | 5 | 0000009D | 00000B90 | 5 | *** | 17 | 5 | 00003A7A | 0000BCB8 | 9 |
| 12 | 5 | 0000009D | 00000B90 | 5 | *** | 17 | 5 | 00003A7B | 0001BCB8 | 10 |
| 12 | 5 | 0000009D | 00000B90 | 5 | *** | 17 | 5 | 00003C32 | 00009878 | 7 |
| 12 | 5 | 0000009D | 00000B90 | 5 | *** | 17 | 5 | 00003C76 | 0000DC78 | 9 |
| 12 | 5 | 0000009D | 00000B90 | 5 | *** | 17 | 5 | 00003CBA | 0000BA78 | 9 |
| 12 | 5 | 0000009D | 00000B90 | 5 | *** | 17 | 5 | 00003CBB | 0001BA78 | 10 |

...

1850 results form 358,657 possibilities (13 x 27589)

FIG. 4

A subsection of output results

```
12 5 0000009D 000000B90 5 *** 17 5 0000CD71 00011D66 9 *** 22 6 0003C38E 001C70F0 10 *** 26 7 03BCF6CF 03CDBCF7 19
12 5 0000009D 000000B90 5 *** 17 5 0000CD71 00011D66 9 *** 22 6 0003C38E 001C70F0 10 *** 26 7 03C79EDF 03EDE78F 19
12 5 0000009D 000000B90 5 *** 17 5 0000CD71 00011D66 9 *** 22 6 0003C38E 001C70F0 10 *** 26 7 03CBEAEF 03DD5F4F 19
12 5 0000009D 000000B90 5 *** 17 5 0000CD71 00011D66 9 *** 22 6 0003C38E 001C70F0 10 *** 26 7 03D55F3F 03F3EAAF 19
12 5 0000009D 000000B90 5 *** 17 5 0000CD71 00011D66 9 *** 22 6 000545B4 000B68A8 9  *** 26 7 0038797D 02FA7870 14
12 5 0000009D 000000B90 5 *** 17 5 0000CD71 00011D66 9 *** 22 6 000545B4 000B68A8 9  *** 26 7 003879E6 019E7870 13
12 5 0000009D 000000B90 5 *** 17 5 0000CD71 00011D66 9 *** 22 6 000545B4 000B68A8 9  *** 26 7 003879E7 039E7870 14
12 5 0000009D 000000B90 5 *** 17 5 0000CD71 00011D66 9 *** 22 6 000545B4 000B68A8 9  *** 26 7 003879EB 035E7870 14
12 5 0000009D 000000B90 5 *** 17 5 0000CD71 00011D66 9 *** 22 6 000545B4 000B68A8 9  *** 26 7 003879ED 02DE7870 14
12 5 0000009D 000000B90 5 *** 17 5 0000CD71 00011D66 9 *** 22 6 000545B4 000B68A8 9  *** 26 7 003879EF 03DE7870 15
12 5 0000009D 000000B90 5 *** 17 5 0000CD71 00011D66 9 *** 22 6 000545B4 000B68A8 9  *** 26 7 0038E1E5 029E1C70 12
12 5 0000009D 000000B90 5 *** 17 5 0000CD71 00011D66 9 *** 22 6 000545B4 000B68A8 9  *** 26 7 0038E1E6 019E1C70 12
12 5 0000009D 000000B90 5 *** 17 5 0000CD71 00011D66 9 *** 22 6 000545B4 000B68A8 9  *** 26 7 003C3CF3 033CF0F0 14
12 5 0000009D 000000B90 5 *** 17 5 0000CD71 00011D66 9 *** 22 6 000545B4 000B68A8 9  *** 26 7 003C3CF5 02BCF0F0 14
12 5 0000009D 000000B90 5 *** 17 5 0000CD71 00011D66 9 *** 22 6 000545B4 000B68A8 9  *** 26 7 003C3CF6 01BCF0F0 14
12 5 0000009D 000000B90 5 *** 17 5 0000CD71 00011D66 9 *** 22 6 000545B4 000B68A8 9  *** 26 7 003C3CF7 03BCF0F0 15
12 5 0000009D 000000B90 5 *** 17 5 0000CD71 00011D66 9 *** 22 6 000545B4 000B68A8 9  *** 26 7 003CBAD7 03AD74F0 15
12 5 0000009D 000000B90 5 *** 17 5 0000CD71 00011D66 9 *** 22 6 000545B4 000B68A8 9  *** 26 7 003CBADB 036D74F0 15
12 5 0000009D 000000B90 5 *** 17 5 0000CD71 00011D66 9 *** 22 6 000545B4 000B68A8 9  *** 26 7 003CBAFF 03FD74F0 17
12 5 0000009D 000000B90 5 *** 17 5 0000CD71 00011D66 9 *** 22 6 000545B4 000B68A8 9  *** 26 7 003CBEAA 0155F4F0 14
12 5 0000009D 000000B90 5 *** 17 5 0000CD71 00011D66 9 *** 22 6 000545B4 000B68A8 9  *** 26 7 003CBEAB 0355F4F0 15
12 5 0000009D 000000B90 5 *** 17 5 0000CD71 00011D66 9 *** 22 6 000545B4 000B68A8 9  *** 26 7 003CBEAD 02D5F4F0 15
12 5 0000009D 000000B90 5 *** 17 5 0000CD71 00011D66 9 *** 22 6 000545B4 000B68A8 9  *** 26 7 003CBEAF 03D5F4F0 16
12 5 0000009D 000000B90 5 *** 17 5 0000CD71 00011D66 9 *** 22 6 000545B4 000B68A8 9  *** 26 7 003CBEB5 02B5F4F0 15
12 5 0000009D 000000B90 5 *** 17 5 0000CD71 00011D66 9 *** 22 6 000545B4 000B68A8 9  *** 26 7 003CBEF7 03BDF4F0 17
12 5 0000009D 000000B90 5 *** 17 5 0000CD71 00011D66 9 *** 22 6 000545B4 000B68A8 9  *** 26 7 003CBEFB 037DF4F0 17
12 5 0000009D 000000B90 5 *** 17 5 0000CD71 00011D66 9 *** 22 6 000545B4 000B68A8 9  *** 26 7 003CBEFD 02FDF4F0 17
```

FIG. 5

METHODS AND SYSTEMS FOR REDUCING THE LIKELIHOOD OF FALSE POSITIVE DECODES

FIELD OF THE INVENTION

The invention is directed to systems and methods for reducing the likelihood of false positive decodes. More particularly, the invention is directed to systems and methods for reducing the likelihood of false positive decodes within a set of barcodes.

BACKGROUND DESCRIPTION

A barcode is an optical machine-readable representation of data, which identifies, for example, a product or object. The barcode has become a ubiquitous element in commercial and industrial use. For example, the barcode not only is used to identify items, e.g., product or objects, but it also helps to track items and provide other commercial uses, e.g., provide product information, discounts or special marketing offers.

Barcodes can be used to track numerous different items, ranging from rental cars to airline luggage. Barcodes can also be used to provide delivery information for sorting and sequencing of items into a delivery order sequence. For example, barcodes are used with first class mail, registered mail, express mail and parcels, as well as circulars and other types of mass mailings in order to sequence such items into a delivery order. By way of example, the United States Postal System (USPS) uses barcode symbology known as POSTNET (Postal Numeric Encoding Technique) to assist in sorting and sequencing the mail. POSTNET is being replaced by the Intelligent Mail barcode (also known as OneCode Solution).

Barcodes systematically represent data by varying the widths and spacings of parallel lines. One type of barcode that is used mainly for postal applications is a 4-state barcode. This type of barcode has constant bar and space width. Data is encoded in the barcode by varying the height of the bars. There are four types of parallel lines: tracker, ascender, descender and full. A tracker bar spans the middle third of the coding region; whereas, an ascender bar spans the top and middle third of the coding region and a descender bar spans the middle and bottom third of the coding region. A full bar spans the entire coding region. In the past most of these barcodes were designed with an extra bar at either end (called guard or framing bars) to help avoid misalignment during decoding. They might also have internal sequences of bars with fixed patterns (UPU S18d) for the same purpose. Newer barcodes designs however, often use different more integrated methods for barcode alignment that do not require these alignment specific bars.

Barcodes can be scanned by optical scanners called barcode readers. These optical scanners can be a handheld device, e.g., portable digital assistants, stationary devices or other computing devices. In any scenario, the barcode reader is designed to read and decode the barcode. However, decoding of barcodes is a complicated process, particularly when the barcode is damaged or obscured in some manner. For example, the barcode reader can have difficulty decoding the barcode due to it being partially obscured within a window of an envelope, cut off or damaged, rotated with respect to the barcode reader, amongst a host of other conceivable issues.

In an attempt to compensate for such issues, many different error detection and compensation processes have been developed. Illustratively, a widely used process is the Reed-Solomon approach. The Reed-Solomon approach is a systematic way of building codes that could detect and correct multiple random symbol errors. Although this is a very effective approach, for a set of several different Reed Solomon based 4-State barcodes, incorrect identification (confusing one barcode for another) combined with rotation and alignment problems may result in false positive Reed Solomon decodes. This problem is significantly more likely to occur when the misalignment is a multiple of 3 bars (the number of bars that together form each Reed Solomon character).

In an environment where there are several different types of 4-state barcodes that may be present it becomes difficult for the decoder to balance the need to decode damaged barcodes with the need to avoid false positive decodes due to confusing the barcodes types.

SUMMARY OF THE INVENTION

In an aspect of the invention, a method implemented in a computing device, comprises: providing a list of barcode configurations that meet damage tolerance criteria; reducing, if possible, each configuration list to barcode configurations that have a compatible configuration pair between sets; and comparing all possible combinations of barcode type configurations to find at least one set of configurations that are resistant to false positives decodes between barcode types during decoding processes.

In yet another aspect of the invention, a computer program product for confusion avoidance comprises a computer usable storage medium program code embodied in a storage medium. The program code is readable/executable by a computing device to: reduce each of a plurality of configuration lists for each pair of barcode types to barcode configurations that have a compatible configuration pair between sets; and compare all possible combinations of barcode type configurations to find at least one set of configurations that are resistant to false positives decodes between barcode types during decoding processes.

In still yet another aspect of the invention, a system comprises a CPU, a computer readable memory and a computer readable storage medium. The system further comprises program instructions to: program instructions to reduce each of a plurality of configuration lists for each pair of barcode types to barcode configurations that have a compatible configuration pair between sets; and program instructions to compare all possible combinations of barcode type configurations to find at least one set of configurations that are resistant to false positives decodes between barcode types during decoding processes. The program instructions are stored on the computer readable storage.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein:

FIG. 4 shows a partial list of compatible pairs of codes; and

FIG. 5 is an exemplary list of acceptable (compatible) codes provided for subsequent Reed Solomon (RS) decoding processes, as generated by implementing the processes of the present invention.

DETAILED DESCRIPTION OF EMBODIMENTS OF THE INVENTION

Figure 1:
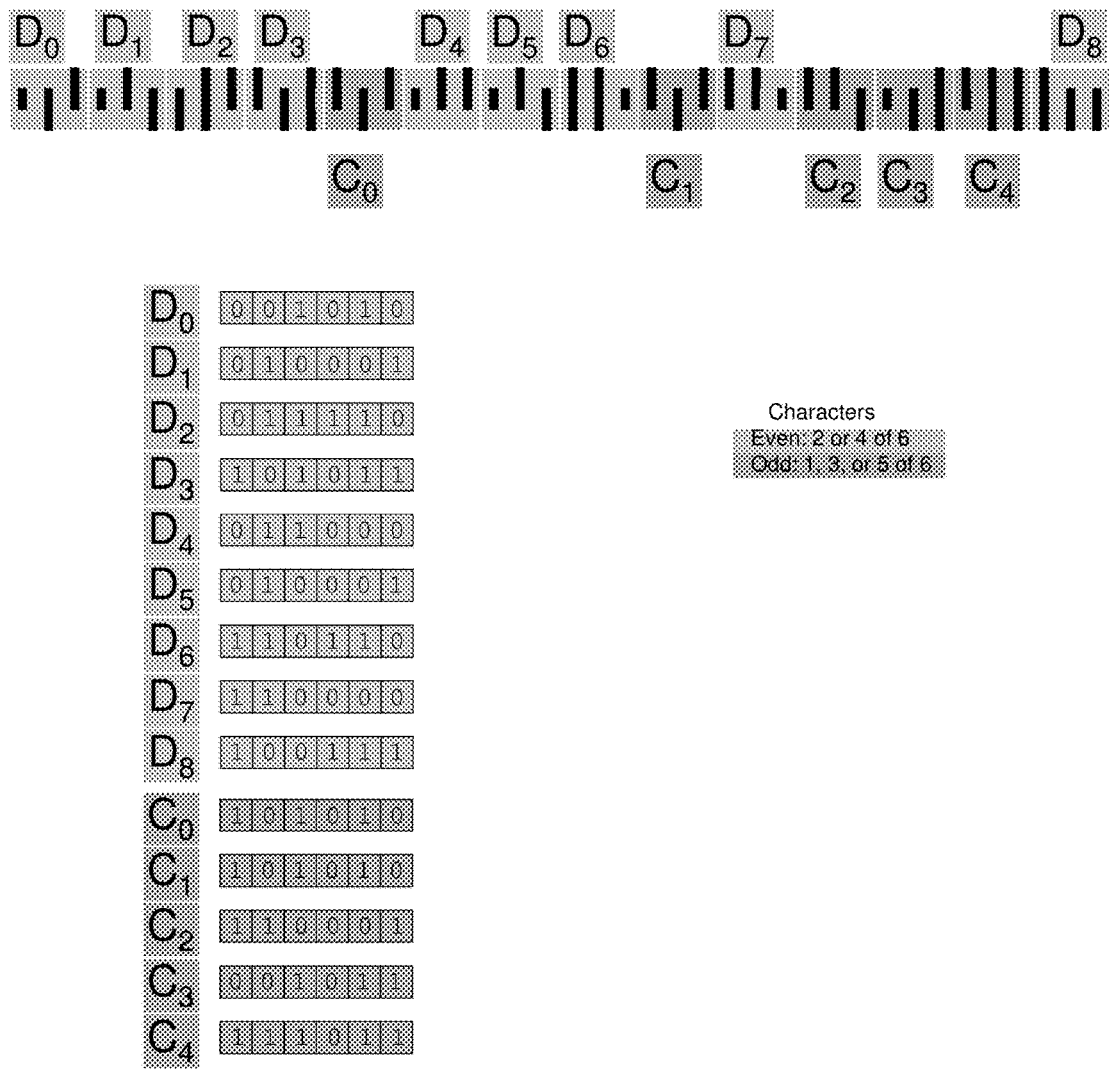
FIG. 1 shows an illustrative three (3) bar grouping of a barcode, which can be used in implementing the processes in accordance with aspects of the invention.

The invention is directed to systems and methods for reducing the likelihood of false positive decodes. More particularly, the invention is directed to systems and methods for reducing the likelihood of false positive decodes within a set of barcodes. In even more specific embodiments, the invention is directed to systems and methods for reducing the likelihood of false positive decodes within a set of barcodes with three (3) bar groups and Reed Solomon error detection and correction. By way of example, the present invention comprises an inter barcode confusion avoidance process, which can be performed (during the barcode design process) prior to a decoding process. By implementing the present invention, it is possible to avoid false positive decodes in, for example, Reed Solomon decodes.

Although the present invention is discussed with regard to decoding of barcodes, the present invention also contemplates other decode implementations such as, for example, applications related to consumer electronics, data transmission technologies and computer applications, amongst other applications. More specifically, the present invention can be implemented in consumer electronics such as CDs, DVDs, Blu-ray Discs, in data transmission technologies such as DSL and WiMAX, in broadcast systems such as DVB and ATSC, and in computer applications such as RAID 6 systems.

It should be understood by those of skill in the art that non-multiples of three (3) misalignments in barcodes cause an essentially random set of numbers to be presented to a Reed Solomon (RS) decoder. The RS decoder generally is able to successfully reject these non-multiples of three (3) misalignments, thereby avoiding false positives. However, multiples of three (3) misalignments present the RS decoder with a sequence that is correct except for the fact that it has been shifted left or right a number of positions. This situation, though, may result in an unacceptably high rate of false acceptances (false positives). The present invention solves such false positive issues by having 3 bar groups (as discussed below) carry additional information indicating whether these groups are in the correct position for decoding. In this way, when barcodes are determined to exceed a certain threshold value, e.g., above a certain confusion value, they can be rejected prior to the RS decoding phase. By preemptively rejecting "bad" codes, false positive decodes using RS decoding can essentially be eliminated. Accordingly, the present invention comprises an inter barcode confusion avoidance process, which can be performed prior to a decoding process thereby avoiding false positive decodes in, for example, RS decodes.

The present invention provides several advantages. By way of illustrative examples, advantages of the systems and/or processes of the present invention include:

(i) not forcing a single (worst case length) physical format;

(ii) allowing different barcodes to be close in length (even the same); and (iii) eliminating the need for overhead (length) of extra bars for framing and/or fixed patterns.

This is in comparison to previous solutions which require having:

(i) one physical barcode format which would then have an internal field indicating which message is being sent. In some cases, this "minor addition" of bars may increase the barcode length beyond acceptable limits;

(ii) the barcodes be very different lengths; or (iii) unique framing and/or internal fixed patterns.

FIG. 1 shows a barcode comprising a three (3) bar grouping. The 3 bar groupings can each be assigned an identifier, as with an odd group or an even group. In the illustrative example, a sequence of even and odd groups may be represented by a corresponding sequence of 1's and 0's (binary representations). For example, the configuration of FIG. 1 is $11110111010001_2$ or $3DD1_{16}$. This binary representation can be used for subsequent barcode confusion avoidance processing in accordance with aspects of the present invention. Although the present invention will be described in relation to a 3 bar group, one of skill in the art should understand that the present invention can also be successfully implemented in other environments, including different barcode types, etc. as described herein.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage having computer-usable program code embodied in the medium (non-transitory medium). The computer-usable or computer-readable medium may be medium that can contain or store information for use by or in connection with the instruction execution system, apparatus, or device. The computer-usable or computer-readable medium may be, for example, an electronic, magnetic, optical, electromagnetic, infrared, or semiconductor system, apparatus, or device. More specific examples of the computer readable storage medium, memory or device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium, memory or device, or computer-usable or computer-readable medium, as used herein, is not to be construed as being transitory signals per se.

Figure 2:
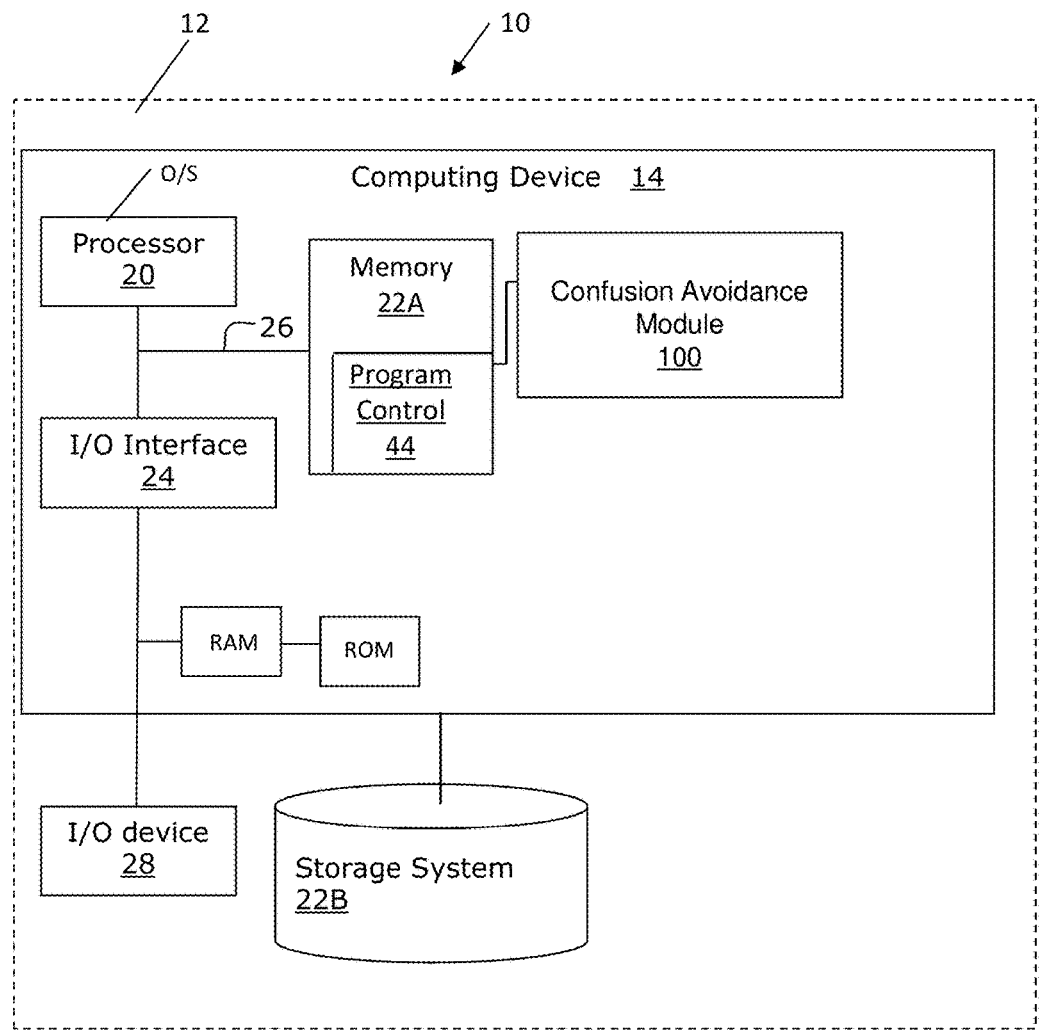
FIG. 2 shows an illustrative environment for implementing the steps in accordance with aspects of the invention.

FIG. 2 shows an illustrative environment 10 for managing the processes in accordance with the invention. The environment 10 includes a server or other computing system 12 that can perform the processes described herein. In embodiments, the illustrative environment may be used in a mail sorting and sequencing system, as shown illustratively in FIG. 3; although other sorting and sequencing systems are also contemplated by the present invention. The computing system 12 includes a computing device 14 which can be resident on or communicate with a network infrastructure or other computing devices.

The computing device 14 includes a processor 20, memory 22A, an I/O interface 24, and a bus 26. In addition, the computing device includes random access memory (RAM), a read-only memory (ROM), and an operating system (O/S). The computing device 14 is in communication with an external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link or any device that enables the computing device 14 to interact with is environment. By way of example, the I/O device 28 can be a barcode scanning device or other optical reading device, for reading barcodes, implementing RS error correction processes.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code 44 executes the processes of the invention such as, for example, determining whether groups of symbols, e.g., 3 bar groups of a barcode, are in the correct position for decoding. As discussed in more detail below, by making such determination it is now possible to determine whether the barcode is deemed to be within an acceptable limit for a RS decode, e.g., compatible with an RS correction error process. This will ensure that the RS decode will not result in a false positive, as the barcode already has passed an initial test to determine its suitability for the RS decode.

The computing device 14 includes a confusion avoidance module 110, which can be implemented as one or more program code in the program control 44 stored in memory 22A as a separate or combined module. Additionally, the confusion avoidance module 110 may be implemented as separate dedicated processors or a single or several processors to provide the functionality of this tool. Moreover, it should be understood by those of ordinary skill in the art that the confusion avoidance module 110 is used as a general descriptive term for providing the features and/or functions of the present invention, and that the confusion avoidance module 110 may comprise many different components such as, for example, the components and/or infrastructure described and shown with reference to FIG. 2.

IMPLEMENTATIONS

An implementation of the invention has three main steps. The first step is making each barcode type resistant to false positives decodes with "damaged" instances of itself. The result of this step is a list of barcode configurations that meet damage tolerance criteria. This first step should preferably be completed for each barcode type before moving to the second stop. The second step takes each pair of barcode types and reduces (if possible) each of their configuration lists to those barcodes configurations that have a compatible configuration pair between sets. This reduction in list sizes is done to make it more likely that the third step is computationally feasible. The third step is to compare all possible combinations of barcode type configurations in order to find at least one set of configurations that are resistant to false positives decodes between barcode types.

By way of illustrative non-limiting exemplary use of the first step of the three step process, the systems and processes of the present invention implement five tests on a prototype code (binary representation) that can show the susceptibility to left/right clipping and rotation confusion of the code type. These tests can be used for a plurality of code types, as described herein. These tests include:

(i) Left clipped left aligned ("n" number of spaces): This refers to moving the binary representation of a prototype barcode a predetermined amount of spaces ("n" number of spaces) to the left, and providing a dash or other non-binary value on the right side of the binary representation equal to the number of spaces moved;

(ii) Right clipped right aligned ("n" number of spaces): This refers to moving the binary representation of the prototype barcode a predetermined amount of spaces ("n" number of spaces) to the right, and providing a dash or other non-binary value on the left side of the binary representation equal to the number of spaces moved;

(iii) Rotated 180°, left clipped left aligned ("n" number of spaces): This refers to rotating the binary representation of the prototype barcode 180 degrees (flipping) and then moving the binary representation of the prototype barcode a predetermined amount of spaces ("n" number of spaces) to the left, and providing a dash or other non-binary value on the right side of the binary representation equal to the number of spaces moved;

(iv) Rotated 180°, right clipped right aligned ("n" number of spaces): This refers to rotating the binary representation of the prototype barcode 180 degrees (flipping) and then moving the binary representation of the prototype barcode a predetermined amount of spaces ("n" number of spaces) to the right, and providing a dash or other non-binary value on the left side of the binary representation equal to the number of spaces moved; and (v) Rotated 180°, not clipped: This refers to rotating the binary representation of the prototype barcode 180 degrees (flipping) and not clipping the binary representation of the prototype barcode.

The first four tests are run with clipping amounts from n=1 to a confusion limit; whereas, the last test is run once. In these tests, a comparison is made between the prototype (represented as a binary value as described with regard to FIG. 1) and the test representations (e.g., left and right clipping, with and without 180° rotation, etc.), where each misaligned representation, e.g., 0, 1 or 1, 0, will result in a value of 1. These values are then added resulting in a confusion protection value.

More specifically, as shown and described in the examples below, for each test, a confusion protection value is calculated. By way of specific example, this confusion protection value is the sum of the XOR of prototypes of bar groups against the test barcodes bar groups (1 bit for each group). After all tests, the minimum value of all the confusion protection values will be used as the overall confusion protection value. If the overall confusion protection value is greater or equal to the confusion limit, the configuration is considered to be acceptable and can then be passed to the RS decode process.

In embodiments, the confusion limit can be a maximum value, which has been determined to result in no false positives in a RS decode. In the example provided herein, the confusion limit value has been set to 5; although other values may be used depending on such factors as, for example, the type of barcodes being decoded, the processes for decoding the barcode, e.g., the strength of the tools decoding the barcode, etc.

In the examples provided below, the initial prototype code (e.g., the barcode being tested) is 11110111010001 and the confusion limit is set at 5. It should be understood that these tests can be run for a number of different prototypes, any of which may result in a compatible code for further decode processing.

| Test 1: Left Clipped Left Aligned: | |
|---|---|
| 11110111010001: | Prototype |
| 1110111010001-: | Left Clipped 1 |
| 00001001110011 = | 7 Confusion Protection Value |
| 11110111010001: | Prototype |
| 110111010001--: | Left Clipped 2 |
| 00101010010111 = | 7 Confusion Protection Value |
| 11110111010001: | Prototype |
| 10111010001---: | Left Clipped 3 |
| 01001101011111 = | 9 Confusion Protection Value |
| 11110111010001: | Prototype |
| 0111010001----: | Left Clipped 4 |
| 10000011011111 = | 8 Confusion Protection Value |
| 11110111010001: | Prototype |
| 111010001-----: | Left Clipped 5 |
| 00011111111111 = | 11 Confusion Protection Value |

The above tests result in a Left Clipped Left Aligned Minimum Confusion Protection Value of 7. This minimum value is greater than the confusion limit value of 5.

| Test 2: Right Clipped Right Aligned: | |
|---|---|
| 11110111010001: | Prototype |
| -1111011101000: | Right Clipped 1 |
| 10001100111001 = | 7 Confusion Protection Value |
| 11110111010001: | Prototype |
| --111101110100: | Right Clipped 2 |
| 11001010100101 = | 7 Confusion Protection Value |
| 11110111010001: | Prototype |
| ---11110111010: | Right Clipped 3 |
| 11101001101011 = | 9 Confusion Protection Value |
| 11110111010001: | Prototype |
| ----1111011101: | Right Clipped 4 |
| 11111000001100 = | 7 Confusion Protection Value |
| 11110111010001: | Prototype |
| -----111101110: | Right Clipped 5 |
| 11111000111111 = | 11 Confusion Protection Value |

The above tests result in a Right Clipped Right Aligned Minimum Confusion Protection Value of 7. This minimum value is greater than the confusion limit value of 5.

| Test 3: Rotated 180°, Left Clipped Left Aligned: | |
|---|---|
| 11110111010001: | Prototype |
| 0001011101111-: | Rotated 180, Left Clipped 1 |
| 11100000001110 = | 6 Confusion Protection Value |
| 11110111010001: | Prototype |
| 001011101111--: | Rotated 180, Left Clipped 2 |
| 11011001101111 = | 10 Confusion Protection Value |
| 11110111010001: | Prototype |
| 01011101111---: | Rotated 180, Left Clipped 3 |
| 10101010101111 = | 9 Confusion Protection Value |
| 11110111010001: | Prototype |
| 1011101111----: | Rotated 180, Left Clipped 4 |
| 01001100101111 = | 8 Confusion Protection Value |
| 11110111010001: | Prototype |
| 011101111-----: | Rotated 180, Left Clipped 5 |
| 10000000111111 = | 7 Confusion Protection Value |

The above tests result in a Rotated 180°, Left Clipped Left Aligned Minimum Confusion Protection Value of 6. This minimum value is greater than the confusion limit value of 5.

| Test 4: Rotated 180°, Right Clipped Right Aligned: | |
|---|---|
| 11110111010001: | Prototype |
| -1000101110111: | Rotated 180, Right Clipped 1 |
| 10110010100111 = | 8 Confusion Protection Value |
| 11110111010001: | Prototype |
| --100010111011: | Rotated 180, Right Clipped 2 |
| 11010101101010 = | 8 Confusion Protection Value |
| 11110111010001: | Prototype |
| ---10001011101: | Rotated 180, Right Clipped 3 |
| 11100110001100 = | 7 Confusion Protection Value |
| 11110111010001: | Prototype |
| ----1000101110: | Rotated 180, Right Clipped 4 |
| 11111111111111 = | 12 Confusion Protection Value |
| 11110111010001: | Prototype |
| -----100010111: | Rotated 180, Right Clipped 5 |
| 11111011000110 = | 9 Confusion Protection Value |

The above tests result in a Rotated 180°, Right Clipped Right Aligned Minimum Confusion Protection Value of 7. This minimum value is greater than the confusion limit value of 5.

| Test 5: Rotated 180°, Not Clipped (run once): | |
|---|---|
| 11110111010001: | Prototype |
| 10001011101111: | Rotated 180 |
| 01111100111110 = | 10 Confusion Protection Value |

The above test results in a Rotated 180°, Not Clipped Minimum Confusion Protection Value of 10. This minimum value is greater than the confusion limit value of 5.

In view of the above tests, the overall confusion protection value is calculated to be 6. Since this value is greater than the confusion limit of 5, this configuration is considered acceptable and further processing can commence, with an initial high confidence that a false positive will not result. According, in view of the above example, it should now be understood by those of skill in the art that for each test, a confusion protection value is calculated, which is the sum of the XOR of the prototypes bar groups against the test barcodes bar groups (1 bit for each group). For each test, the confusion protection value is compared to the confusion limit (e.g., 5) for the "Decoding as" barcode.

It should be understood by those of skill in the art that many different prototypes can be generated for the inter barcode confusion avoidance processes of the present invention. For example, Table 1 shows a list of examples which can be used in the above tests for a single barcode "A".

| TABLE 1 |
|---|
| List Example A (13 entries) |
| 12 5 0000009D 00000B90 5 |
| 12 5 000000B7 00000ED0 6 |
| 12 5 0000012F 00000F48 6 |
| 12 5 00000137 00000EC8 6 |
| 12 5 000001A7 00000E58 6 |
| 12 5 0000023B 00000DC4 6 |
| 12 5 0000023D 00000BC4 6 |
| 12 5 0000043B 00000DC2 6 |
| 12 5 0000043D 00000BC2 6 |
| 12 5 0000046F 00000F62 7 |
| 12 5 0000048E 00000712 5 |
| 12 5 000007A1 0000085E 6 |
| 12 5 000008ED 00000B71 7 |

By way of explanation of Table 1, the first number (e.g., 12) represents the total number of Reed Solomon data and error correction characters. That is, the first number is the length of the bar code in three bar groups. The second number (e.g., 5) is the number of those 12 Reed Solomon characters that are error correction characters. The third number (e.g., 0000009D, etc,) is a hexadecimal representation of the binary representation of the barcode type with leading 0's, with the rightmost 12 bits being valid. The next number (e.g., 00000B90, etc.) is a reverse instance of the 12 bits that are meaningful. The last number (e.g., 5, etc) is the number of 1 bits that are present in the hexadecimal representation of the binary representation of the barcode type.

In a second step, different pairs of barcodes are compared to one another in order to reduce the list of compatible barcodes. For example, eight tests can be performed to show the susceptibility to confusion for two different barcode types: barcode "A" and barcode "B". This same test methodology can be used to compare other pairs of barcode types. For example, three or four barcode types would result in testing each of the barcode types against each other as described in more detail below. In this way, it is possible to reduce the list of compatible codes with one another.

Assuming initially a comparison of two prototype codes, e.g., barcode type "A" (13 entries) and barcode type "B" (27589 entries), all tests are run with clipping amounts from 0 to the confusion criteria limit for decoding the barcode, for each combination of prototype "A" (13 entries) and prototype "B" (27589 entries). That is, combinations of barcode configurations are tested against each other and compatible sets are identified and saved. The tests include for barcode "A" and barcode "B":

1. Decoding as Barcode A, Barcode B Left Clipped Left Aligned;
2. Decoding as Barcode A, Barcode B Right Clipped Right Aligned;
3. Decoding as Barcode A, Barcode B Rotated 180, Left Clipped Left Aligned;
4. Decoding as Barcode A, Barcode B Rotated 180, Right Clipped Right Aligned;
5. Decoding as Barcode B, Barcode A Left Clipped Left Aligned;
6. Decoding as Barcode B, Barcode A Right Clipped Right Aligned;
7. Decoding as Barcode B, Barcode A Rotated 180, Left Clipped Left Aligned; and
8. Decoding as Barcode B, Barcode A Rotated 180, Right Clipped Right Aligned.

FIG. 4 shows the result of the above tests being run on Barcode "B" and Barcode "A". Note that after Barcode "B" configurations have been tested against Barcode "A" configurations, there are 1850 compatible combinations. If all tests pass, the pair is compatible and is added to the result list (see, e.g., FIG. 4) which, in turn, can be used for RS decoding. That is, the prototype code has been determined to be within acceptable limits (e.g., not exceed the capacity) of the RS error correction, thereby substantially assuring no false positives will result during the RS decode process.

If there are only two (2) barcode types, the processes would then end and a reduced list is provided in FIG. 4. However, it should be understood by those of skill in the art that the same methodology can be used with any number of different barcode types, e.g., four barcodes. By way of further example, the tests can be run with any number of barcode types, e.g., four barcode types, "A", "B", "C" and "D". In an illustrative example of four barcode types, "A", "B", "C" and "D", the number of entries before list reduction is shown representatively in Table 2, below.

TABLE 2

| Barcode Type | Number Of Entries Before List Reduction |
|---|---|
| Barcode A | 13 |
| Barcode B | 27,589 |
| Barcode C | 544,975 |
| Barcode D | 23,474,201 |

In this example, each barcode type "A", "B", "C" and "D" are run against each other, in pairs, using the above noted methodology in order to reduce the list of compatible candidates. For example, the following algorithm is used in implementing the processes of the invention, in order to provide a reduced list of codes for subsequent RS decode (having a reduced likelihood of false positives):

```
for each Barcode A
   for each Barcode B
      if the INTER Bar Group Representation A and B Overall Protection
CPV >= Confusion Limit
         Add Barcode A to New Barcode A List
         break out of Barcode B for loop
   Replace Barcode A List with New Barcode A List
for each Barcode A
   for each Barcode C
      if the INTER Bar Group Representation A and C Overall Protection
CPV >= Confusion Limit
         Add Barcode A to New Barcode A List
         break out of Barcode C for loop
   Replace Barcode A List with New Barcode A List
for each Barcode A
   for each Barcode D
      if the INTER Bar Group Representation A and D Overall Protection
CPV >= Confusion Limit
         Add Barcode A to New Barcode A List
         break out of Barcode D for loop
   Replace Barcode A List with New Barcode A List
for each Barcode B
   for each Barcode A
      if the INTER Bar Group Representation B and A Overall Protection
CPB >= Confusion Limit
         Add Barcode B to New Barcode B List
         break out of Barcode A for loop
   Replace Barcode B List with New Barcode B List
for each Barcode B
   for each Barcode C
      if the INTER Bar Group Representation B and C Overall Protection
CPB >= Confusion Limit
         Add Barcode B to New Barcode B List
         break out of Barcode C for loop
   Replace Barcode B List with New Barcode B List
for each Barcode B
   for each Barcode D
      if the INTER Bar Group Representation B and D Overall Protection
CPB >= Confusion Limit
         Add Barcode B to New Barcode B List
         break out of Barcode D for loop
   Replace Barcode B List with New Barcode B List
for each Barcode C
   for each Barcode A
      if the INTER Bar Group Representation C and A Overall Protection
CPB >= Confusion Limit
         Add Barcode C to New Barcode C List
         break out of Barcode A for loop
   Replace Barcode C List with New Barcode C List
for each Barcode C
   for each Barcode B
      if the INTER Bar Group Representation C and B Overall Protection
CPB >= Confusion Limit
         Add Barcode C to New Barcode C List
         break out of Barcode B for loop
   Replace Barcode C List with New Barcode C List
for each Barcode C
   for each Barcode D
      if the INTER Bar Group Representation C and D Overall Protection
```

-continued

```
CPB >= Confusion Limit
    Add Barcode C to New Barcode C List
    break out of Barcode D for loop
Replace Barcode C List with New Barcode C List
for each Barcode D
    for each Barcode A
        if the INTER Bar Group Representation D and A Overall Protection
CPB >= Confusion Limit
            Add Barcode D to New Barcode D List
            break out of Barcode A for loop
Replace Barcode D List with New Barcode D List
for each Barcode D
    for each Barcode B
        if the INTER Bar Group Representation D and B Overall Protection
CPB >= Confusion Limit
            Add Barcode D to New Barcode D List
            break out of Barcode B for loop
Replace Barcode D List with New Barcode D List
for each Barcode D
    for each Barcode C
        if the INTER Bar Group Representation D and C Overall Protection
CPB >= Confusion Limit
            Add Barcode D to New Barcode D List
            break out of Barcode C for loop
Replace Barcode D List with New Barcode D List
```

After running each pair of barcodes against each other as noted above, the number of barcodes will be reduced, as shown in Table 3. For example, barcode "B" configurations will be reduced to 1,738 as shown in Table 3.

TABLE 3

| Barcode Type | Number Of Entries After List Reduction |
|---|---|
| Barcode A | 13 |
| Barcode B | 1,738 |
| Barcode C | 3,594 |
| Barcode D | 21,616 |

In step 3, the processes of the present invention compare all possible combinations of barcode type configurations to find at least one set of configurations that are resistant to false positives decodes between barcode types during decoding processes. So, by way of non-limiting illustrative example, in a four barcode type, the following algorithm for the example case can be implemented, showing the necessary tests to run:

```
for each Barcode A
    for each Barcode B
        if A and B are compatible
            for each Barcode C
                if C and A are compatible
                    if C and B are compatible
                        for each Barcode D
                            if D and C are compatible
                                if D and B are compatible
                                    if D and A are compatible
                                        save the A,B,C,D combination
```

By implementing the above tests (based on the above algorithm) for four barcode types, a list of acceptable (compatible) codes can be generated as provided in FIG. 5, any of which can be used for subsequent RS decoding processes. That is, each of the outputs in FIG. 5 is a compatible set of barcode configurations for RS decodes as determined by the above tests, e.g., these outputs will resist a false positive result in a subsequent RS decode. It should be understood by those of ordinary skill in the art that the list of outputs in FIG. 5 can be representative of a test run for four barcode types, e.g., "A", "B". "C" and "D"; however, similar lists can be generated for any types of barcode types and, hence, the list of FIG. 5 is meant to be only an illustrative, non-limiting example.

Accordingly, by implementing the confusion avoidance processes of the present invention, it is now possible to significantly increase the number of damaged barcodes that can be decoded, while substantially eliminating false positives due to a different barcode type from the same family being decoded as the wrong type. That is, by implementing the present invention, it is now possible to avoid false positive decodes in, for example, RS decodes by determining during the design process a confusion protection method that will (during the decoding process) eliminate the ability for an incorrect barcode type to continue past the initial stages of decoding and potentially generate a false positive result.

Figure 3:
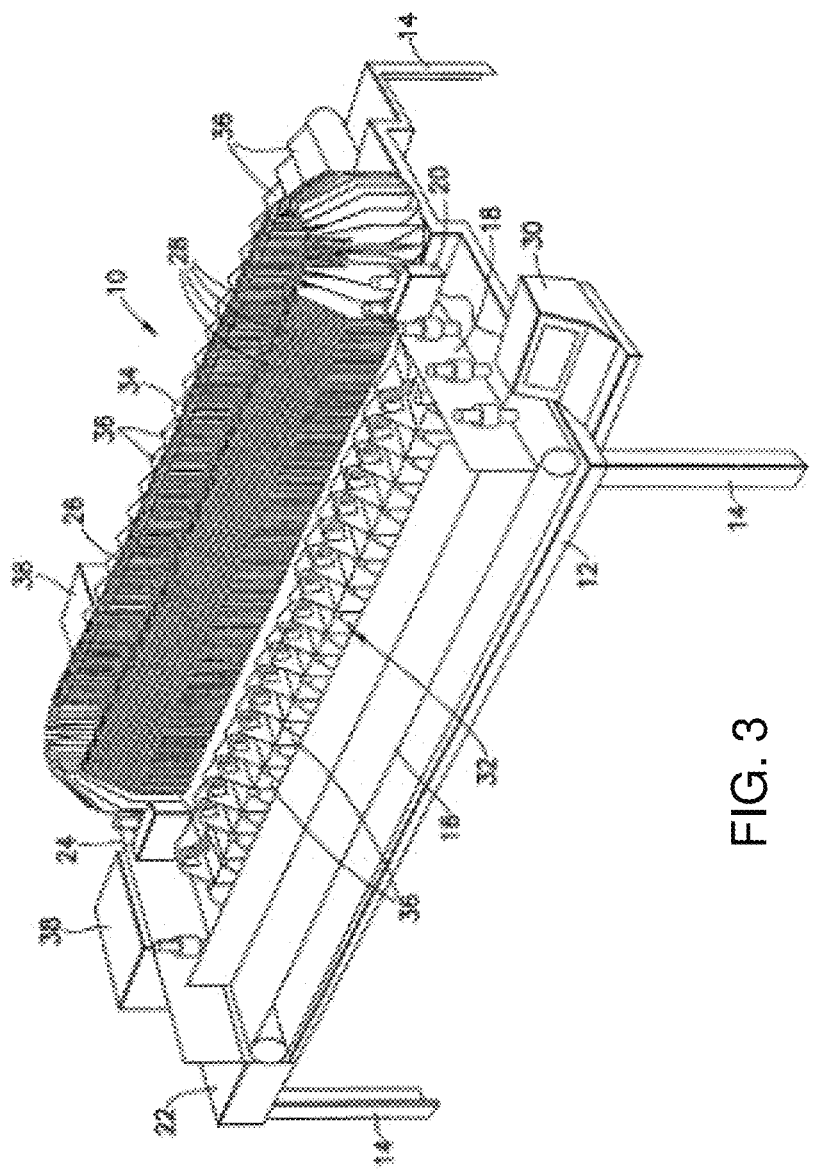
FIG. 3 shows an illustrative mail sorting and sequencing system, which can be used in implementing the processes of the present invention.

FIG. 3 shows an illustrative mail sorting and sequencing system, which can be used with the processes of the present invention. It should be understood by those of skill in the art that the present invention can be implemented with any number of mail sorting and sequencing systems, and that the illustrative representation of the mail sorting and sequencing system of FIG. 3 should not be considered a limiting feature to the claimed invention.

As shown in FIG. 3, the mail sorting and sequencing system is a single pass carrier delivery sequence sorter generally indicated by the numeral 10. The single pass carrier delivery sequence sorter 10 has a base 12 with four legs 14 (only three shown in FIG. 3) extending therefrom. An auto feed station 16 extends lengthwise along the base 12 and has a feeder 18 and an address reader 20 at one end and a manual feed station 22 with a second address reader 24 at the other end. The feeder 18 and address reader 20 create a feed, read and insert path to a racetrack sorting device 26 which has an array of bin dividers 28, adjacent ones of which create holders for individual mail pieces deposited therebetween. A video encoder/numerical controller 30 which may be a microprocessor or the like is located adjacent the feeder 18 and operationally connected to various components of the single pass carrier delivery sequence sorter 10 for coordinating the operation of the same in a manner explained. In embodiments, the address readers 20, 24 and/or video encoder/numerical controller 30 or other computing devices can read barcode information and implement the processes of the present invention. On either side of the racetrack sorting device 26 are two interim unloading station units generally indicated by the numeral 32, each having twenty (20) interim unloading stations 36. At the ends of the interim unloading station units 32, bundling/wrapping stations 38 are mounted on the base 12. See, e.g., U.S. Pat. No. 8,138,438, for a full detailed explanation of the single pass carrier delivery sequence sorter 10 and related systems, the contents of which are incorporated by reference in their entirety herein.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A method implemented in a computing device, comprising: providing a list of barcode configurations that meet damage tolerance criteria by making each barcode type resistant to false positives decodes with respect to damaged instances of each damaged barcode; reducing, if possible, each configuration list to barcode configurations that have a compatible configuration pair between sets; comparing all possible combinations of barcode type configurations to find at least one set of configurations that are resistant to false positives decodes between barcode types during decoding processes; and calculating an overall confusion protection value for a set of prototype code configurations, wherein the overall confusion protection value comprises performing left/right clipping and rotation confusion prototype code configuration of a set of prototype code configurations.

2. The method of claim 1, wherein the providing comprises:
    calculating an overall confusion protection value for a set of prototype code configurations;
    comparing the overall confusion protection value to a confusion limit value; and
    passing each prototype code configuration that has a confusion protection value equal to or greater than the confusion limit value to the list for decoding processes.

3. The method of claim 1, wherein the decoding processes is a Reed Solomon error correction decode.

4. The method of claim 1, wherein the comparing provides avoidance of false positive decodes to multiples of three (3) misalignments with a sequence that is correct except for being shifted left or right a number of positions.

5. The method of claim 1, wherein the reducing comprises comparing different pairs of barcodes to one another to reduce the list of compatible barcodes.

6. The method of claim 1, further comprising implementing tests on a prototype code that shows susceptibility to left/right clipping and rotation confusion of a code type.

7. The method of claim 1, further comprising comparing different pairs of barcodes to one another by performing a susceptibility to confusion test for two different barcode types "A" and "B" at a time, with clipping amounts from 0 to a confusion criteria limit for decoding the barcode.

8. The method of claim 1, further comprising performing a susceptibility to confusion test for different barcode types, in pairs, with clipping amounts from 0 to a confusion criteria limit for decoding the barcode.

9. The method of claim 1, further comprising calculating an overall confusion protection value for a set of prototype code configurations and comparing the overall confusion protection value to a confusion limit value.

10. A method implemented in a computing device, comprising: providing a list of barcode configurations that meet damage tolerance criteria by making each barcode type resistant to false positives decodes with respect to damaged instances of each of the damaged barcodes; reducing, if possible, each configuration list to barcode configurations that have a compatible configuration pair between sets; and comparing all possible combinations of barcode type configurations to find at least one set of configurations that are resistant to false positives decodes between barcode types during decoding processes; and calculating an overall confusion protection value for a set of prototype code configurations, wherein the overall confusion protection value comprises performing the following to each prototype code configuration of a set of prototype code configurations: (i) left clipped left aligned ("n" number of spaces); (ii) right clipped right aligned ("n" number of spaces); (iii) rotated 180°, left clipped left aligned ("n" number of spaces); (iv) rotated 180°, right clipped right aligned ("n" number of spaces); and (v) rotated 180°, not clipped.

* * * * *